US012579764B2

(12) United States Patent
Tran

(10) Patent No.: US 12,579,764 B2
(45) Date of Patent: Mar. 17, 2026

(54) SYSTEMS AND METHOD FOR ENHANCED PORTAL SYSTEMS IN AUGMENTED REALITY VIRTUAL ENVIRONMENTS

(71) Applicant: PEER INC, Bellevue, WA (US)

(72) Inventor: Thinh Tran, Bellevue, WA (US)

(73) Assignee: PEER GLOBAL INC, Dover, DE (US)

( * ) Notice: Subject to any disclaimer, the term of this patent is extended or adjusted under 35 U.S.C. 154(b) by 94 days.

(21) Appl. No.: 18/448,774

(22) Filed: Aug. 11, 2023

(65) Prior Publication Data

US 2024/0054737 A1     Feb. 15, 2024

Related U.S. Application Data

(60) Provisional application No. 63/397,178, filed on Aug. 11, 2022.

(51) Int. Cl.
 *G06T 19/00* (2011.01)
 *G01S 17/89* (2020.01)
(52) U.S. Cl.
 CPC ............ *G06T 19/006* (2013.01); *G01S 17/89* (2013.01); *G06T 19/003* (2013.01)
(58) Field of Classification Search
 CPC ..... G06T 19/006; G06T 19/003; G01S 17/89; G06F 3/017; G06F 3/0304; G06F 3/011
 See application file for complete search history.

(56) References Cited

U.S. PATENT DOCUMENTS

| | | | |
|---|---|---|---|
| 10,546,426 B2 | 1/2020 | Balan et al. | |
| 10,747,414 B2 | 8/2020 | Tran | |
| 11,586,337 B2 | 2/2023 | Tran | |
| 11,783,555 B2 | 10/2023 | Tran | |
| 2016/0026253 A1 | 1/2016 | Bradski | |
| 2018/0095635 A1* | 4/2018 | Valdivia | G02B 27/0093 |
| 2018/0122124 A1* | 5/2018 | Thornton | G06T 17/10 |
| 2018/0122147 A1* | 5/2018 | Janzer | G06T 19/20 |
| 2019/0005717 A1* | 1/2019 | Singh | G06T 15/80 |
| 2020/0183567 A1 | 6/2020 | Gullicksen | |
| 2021/0216191 A1 | 7/2021 | Hutten et al. | |

OTHER PUBLICATIONS

International Search Report and Written Opinion for PCT Application No. PCT/US2023/30107, dated Nov. 17, 2023, 11 pages.

* cited by examiner

*Primary Examiner* — Jeffery A Brier
(74) *Attorney, Agent, or Firm* — Seed Intellectual Property Law Group LLP

(57) ABSTRACT

An augmented reality method for enabling portal functionality in a multi-dimensional fabric user interface is described herein. The method includes: creating a simulated space in the multi-dimensional fabric user interface; calculating a virtual representation of the physical space using the captured images and measurements; placing the virtual representation of the physical space into the simulated space; creating an initial portal in the multi-dimensional fabric user interface that connects to the virtual representation of the physical space in the simulated space; enabling one or more users to access the portal in the multi-dimensional fabric user interface to enter the virtual representation of the physical space in the simulated space; and enabling the one or more users to interact with virtual objects in the virtual representation of the physical space in the simulated space.

25 Claims, 15 Drawing Sheets

600

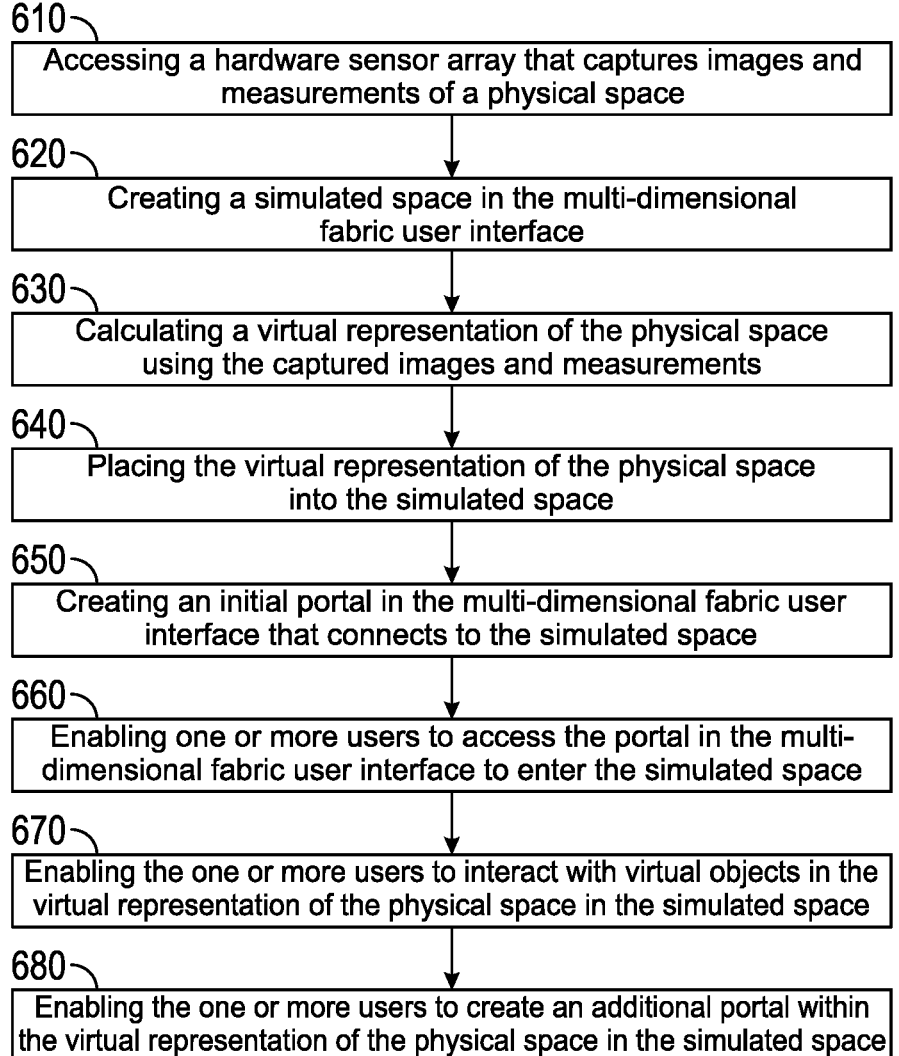

610
Accessing a hardware sensor array that captures images and measurements of a physical space 620
Creating a simulated space in the multi-dimensional fabric user interface 630
Calculating a virtual representation of the physical space using the captured images and measurements 640
Placing the virtual representation of the physical space into the simulated space 650
Creating an initial portal in the multi-dimensional fabric user interface that connects to the simulated space 660
Enabling one or more users to access the portal in the multi-dimensional fabric user interface to enter the simulated space 670
Enabling the one or more users to interact with virtual objects in the virtual representation of the physical space in the simulated space 680
Enabling the one or more users to create an additional portal within the virtual representation of the physical space in the simulated space

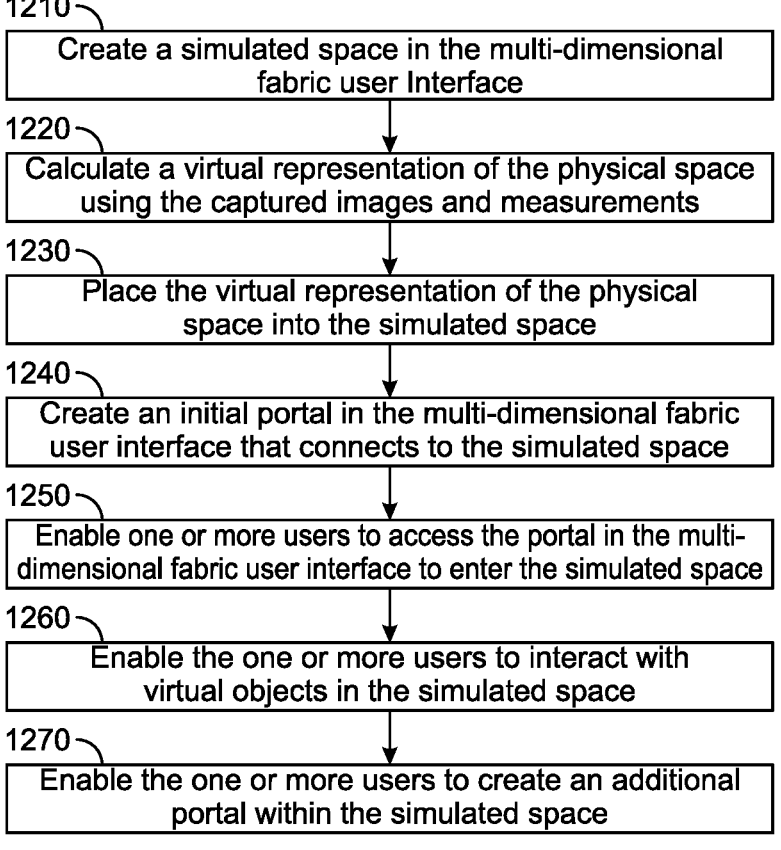

1210 —
Create a simulated space in the multi-dimensional fabric user Interface

1220 —
Calculate a virtual representation of the physical space using the captured images and measurements 1230 —
Place the virtual representation of the physical space into the simulated space 1240 —
Create an initial portal in the multi-dimensional fabric user interface that connects to the simulated space 1250 —
Enable one or more users to access the portal in the multi-dimensional fabric user interface to enter the simulated space 1260 —
Enable the one or more users to interact with virtual objects in the simulated space 1270 —
Enable the one or more users to create an additional portal within the simulated space

*FIG. 12*

SYSTEMS AND METHOD FOR ENHANCED PORTAL SYSTEMS IN AUGMENTED REALITY VIRTUAL ENVIRONMENTS

TECHNICAL FIELD

The present disclosure pertains to augmented reality virtual environments, and more particularly, to augmented reality virtual environments that contain portals that are accessible to users.

BACKGROUND

Description of the Related Art

Operating systems have changed little over the past few decades. Early operating systems were command driven, where a user specified a particular file location to access data. These operating systems morphed into the icon-based interfaces used today. Icon-based operating systems display graphical representations, or icons, of files or data. Icons are associated with a particular file location, such that interaction with an icon by a user results in the corresponding file location being accessed. Accordingly, historical operating systems have been structured around using the file's location within the memory to access data, which limits the flexibility of using alternative storage structures.

Additionally, there is a continuing desire to virtually visit actual physical locations that exist in the real world for a variety of purposes. This may be as basic as using a mapping software application. However, traditional mapping software is very limited in the information that is conveys and the user experience that it provides.

Furthermore, there is a continuing desire to improve methods of travel between virtual locations in an augmented reality virtual environments. The present disclosure addresses this and other needs.

BRIEF SUMMARY

The present disclosure is directed towards augmented reality environments and/or virtual reality environments. Specifically, some aspects of the present disclosure are directed towards augmented reality environments and/or virtual reality environments that contain portals that may be created by users and our accessible by users.

Briefly stated, embodiments of the present disclosure are directed towards an augmented reality system for enabling portal functionality in a multi-dimensional fabric user interface are disclosed. Some such systems include: a hardware sensor array that captures images and measurements of a physical space; a remote server that includes a server memory that stores server computer instructions and a server processor that when executing the server computer instructions causes the remote server to: create a simulated space in the multi-dimensional fabric user interface; calculate a virtual representation of the physical space using the captured images and measurements; place the virtual representation of the physical space into the simulated space; create an initial portal in the multi-dimensional fabric user interface that connects to the simulated space; enable one or more users to access the portal in the multi-dimensional fabric user interface to enter the simulated space; enable the one or more users to interact with virtual objects in the simulated space; and enable the one or more users to create an additional portal within the simulated space.

In some embodiments of the augmented reality system for enabling portal functionality in a multi-dimensional fabric user interface, the additional portal operates to create an exit from the simulated space back to the multi-dimensional fabric user interface. In another aspect of some embodiments, the additional portal operates to create a subspace within the simulated space. In still another aspect of some embodiments, the hardware sensor array uses LIDAR to capture one or more or flat images and images with depth resolution. In yet another aspect of some embodiments, the simulated space is one or more of a virtual reality simulated space or augmented reality simulated space.

In some embodiments, the server processor executes further server computer instructions that further cause the remote server to enable the user to control parameters within the simulated space. In another aspect of some embodiments, one of the parameters within the simulated space that is controllable by the user is time, and wherein the user can speed up or slow down a rate at which time passes. In still another aspect of some embodiments, the server processor executes further server computer instructions that further cause the remote server to enable the user to load one or more of simulated objects and simulated people into the simulated space. In yet another aspect of some embodiments, the loaded one or more of simulated objects and simulated people into the simulated space had their images and measurements captured using the hardware sensor array. Additionally, in another aspect of some embodiments, the server processor executes further server computer instructions that further cause the remote server to enable the user to position the additional portal anywhere in the simulated space.

In other embodiments, one or more augmented reality methods for enabling portal functionality in a multi-dimensional fabric user interface are disclosed. Some such methods include: accessing a hardware sensor array that captures images and measurements of a physical space; accessing a remote server that includes a server memory that stores server computer instructions and a server processor that executes the server computer instructions; creating a simulated space in the multi-dimensional fabric user interface; calculating a virtual representation of the physical space using the captured images and measurements; placing the virtual representation of the physical space into the simulated space; creating an initial portal in the multi-dimensional fabric user interface that connects to the simulated space; enabling one or more users to access the portal in the multi-dimensional fabric user interface to enter the simulated space; enabling the one or more users to interact with virtual objects in the simulated space; and enabling the one or more users to create an additional portal within the simulated space.

In some embodiments of the augmented reality method for enabling portal functionality in a multi-dimensional fabric user interface, the additional portal operates to create an exit from the simulated space back to the multi-dimensional fabric user interface. In another aspect of some embodiments, the additional portal operates to create a subspace within the simulated space. In still another aspect of some embodiments, the hardware sensor array uses LIDAR to capture one or more or flat images and images with depth resolution. In yet another aspect of some embodiments, the simulated space is one or more of a virtual reality simulated space or augmented reality simulated space.

In some embodiments of the augmented reality method, the server processor executes further server computer instructions that further cause the remote server to enable the user to control parameters within the simulated space. In another aspect of some embodiments, one of the parameters within the simulated space that is controllable by the user is time, and wherein the user can speed up or slow down a rate at which time passes. In still another aspect of some embodiments, the server processor executes further server computer instructions that further cause the remote server to enable the user to load one or more of simulated objects and simulated people into the simulated space. In yet another aspect of some embodiments, the loaded one or more of simulated objects and simulated people into the simulated space had their images and measurements captured using the hardware sensor array. Additionally, in another aspect of some embodiments, the server processor executes further server computer instructions that further cause the remote server to enable the user to position the additional portal anywhere in the simulated space.

Additionally, in other embodiments, one or more non-transitory computer-readable storage mediums are disclosed. The one or more non-transitory computer-readable storage mediums have computer-executable instructions stored thereon that, when executed by a processor, cause the processor to: receive captured images and measurements of a physical space from a hardware sensor array; create a simulated space in the multi-dimensional fabric user interface; calculate a virtual representation of the physical space using the captured images and measurements; place the virtual representation of the physical space into the simulated space; create an initial portal in the multi-dimensional fabric user interface that connects to the simulated space; enable one or more users to access the portal in the multi-dimensional fabric user interface to enter the simulated space; enable the one or more users to interact with virtual objects in the simulated space; and enable the one or more users to create an additional portal within the simulated space.

The embodiments described in the present disclosure improve upon known data storage architectures, structures, processes, and techniques in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings:

FIG. 6B is a logic diagram showing virtual representation of the physical space loaded into the simulated space that was captured by the hardware sensor array.

FIG. 12 illustrates is a logic diagram showing an augmented reality method for enabling portal functionality in a multi-dimensional fabric user interface.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
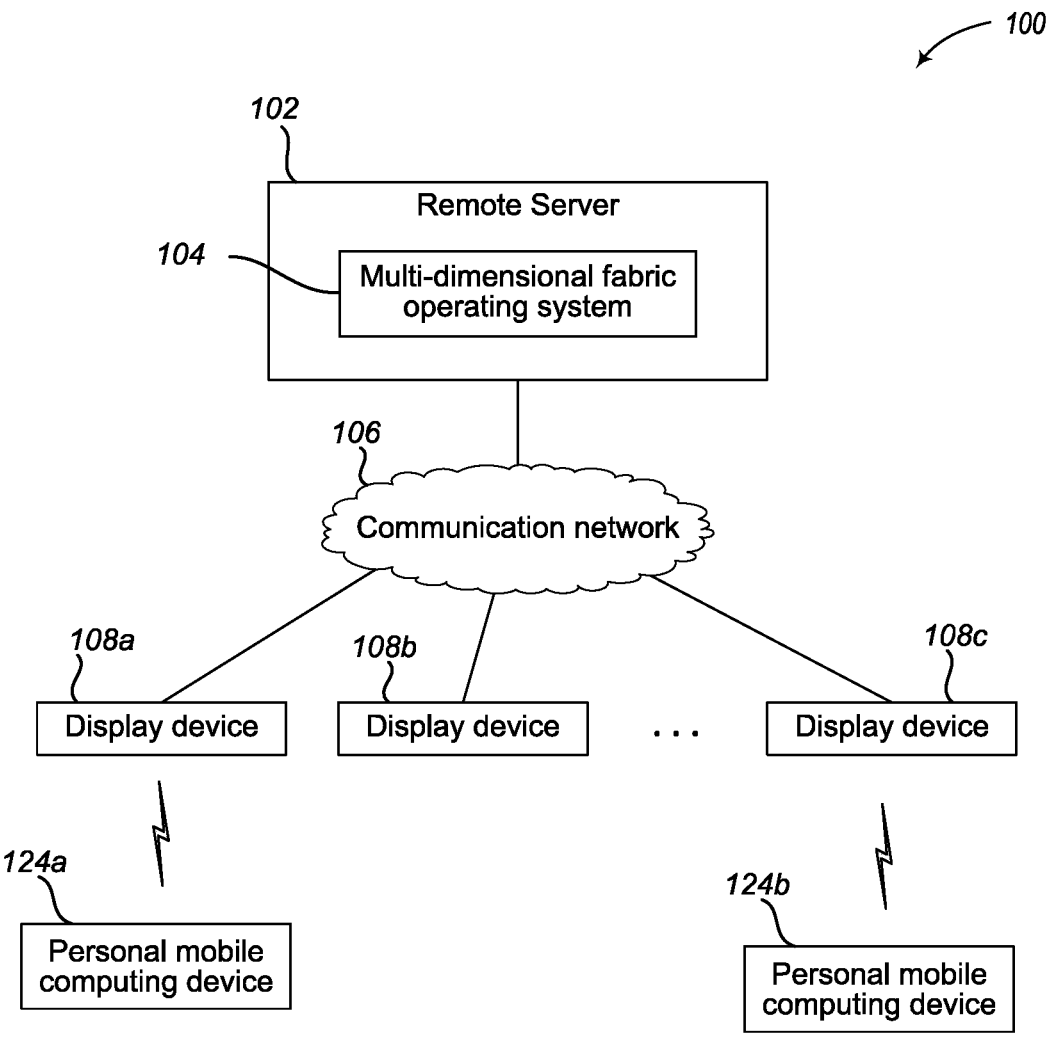
FIG. 1 illustrates a context diagram of an environment that provides a multi-dimensional fabric user interface for storing content in accordance with embodiments described herein.

FIG. 1 illustrates a context diagram of an augmented reality system for enabling portal functionality in a multi-dimensional fabric user interface for storing content in accordance with embodiments described herein. In the illustrated example, environment 100 includes a remote server 102, one or more display devices 108a-108c, and one or more personal mobile computing devices.

The remote server 102 in the augmented reality system for enabling portal functionality in a multi-dimensional fabric user interface is configured as a remote computing system, e.g., cloud computing resources, which implements or executes a multi-dimensional fabric operating system 104. In various embodiments, a separate instance of the multi-dimensional fabric operating system 104 is maintained and executing for each separate personal mobile computing device 124a, 124b. In some embodiments, the multi-dimensional fabric user interface may be implemented as an operating shell.

Although not illustrated, the remote server 102 may also be running various programs that are accessible to the users of the personal mobile computing devices 124a, 124b via the multi-dimensional fabric operating system 104. Accordingly, the environment and system described herein make it possible for a plurality of applications to be run in the cloud, and a user accesses a particular application by moving the fabric to that application's coordinates.

The multi-dimensional fabric operating system 104 in the augmented reality system for enabling portal functionality in a multi-dimensional fabric user interface stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or a location of a display device used to upload the picture from the camera to the remote server), and what the content is about (e.g., food, clothing, entertainment, transportation, etc.).

A user in the augmented reality system for enabling portal functionality in a multi-dimensional fabric user interface can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user. Notably, the user may transmit between the personal mobile computing device 124b and the remote server 102 via the communication network 106, without connecting to a display device 108 in some embodiments.

Figure 2:
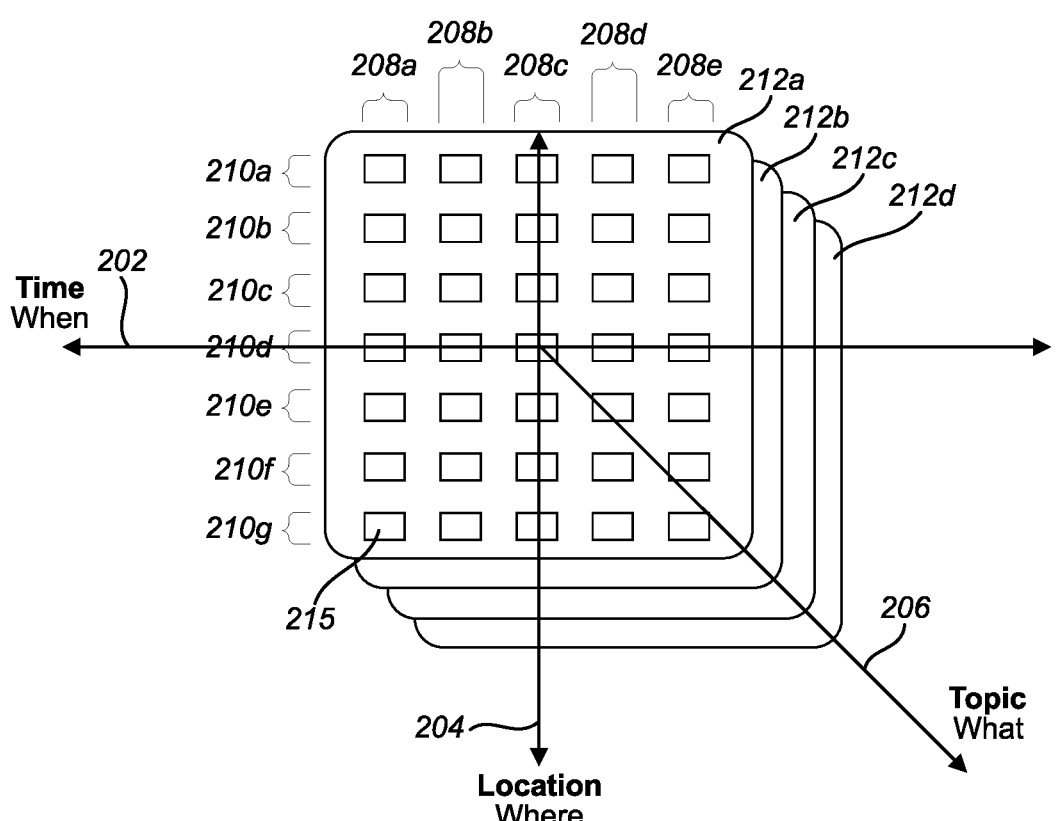
FIG. 2 illustrates a graphical representation of a multi-dimensional fabric user interface for storing content in accordance with embodiments described herein.
Figure 3:
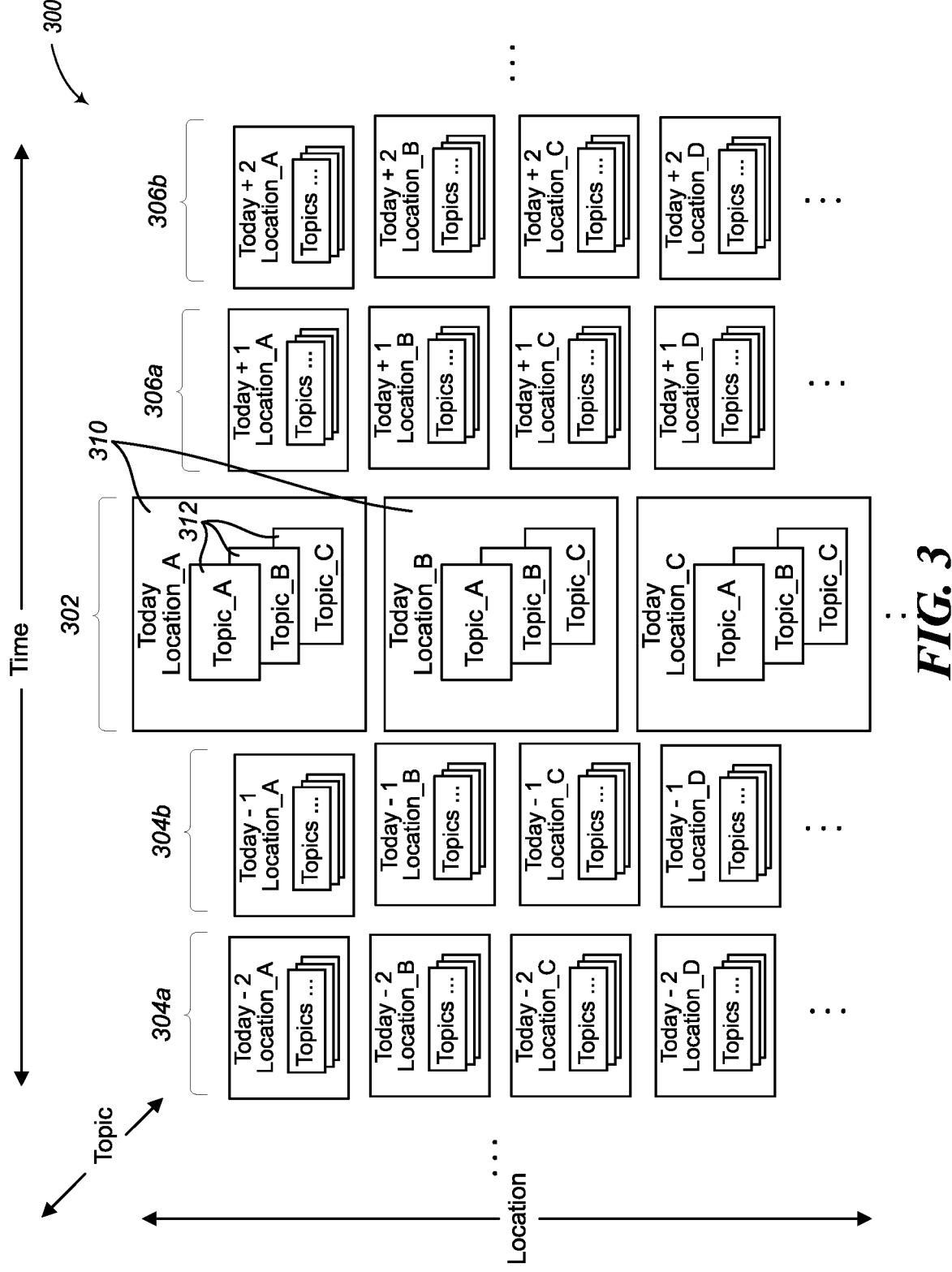
FIG. 3 illustrates another graphical representation of a multi-dimensional fabric user interface for storing content in accordance with embodiments described herein.

FIGS. 2 and 3 illustrate graphical representations of use case examples of an augmented reality system for enabling portal functionality in a multi-dimensional fabric user interface as described herein.

Example fabric 200 in FIG. 2 includes a time axis 202, a location axis, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud.

In some embodiments, users in the multi-dimensional fabric system navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on 3 dimensions (What, When, Where), the fabric provides a pre-configured scaffold that allows a user to navigate the plurality of content without the multi-dimensional fabric system fetching and organizing it. The fabric makes discovering more relevant content immediately accessible.

The time axis 202 in the multi-dimensional fabric system may be arranged as a plurality of different time periods, such as hours or days. In various embodiments, the current time period (e.g., today) is shown in the middle column 208c, which is shown in FIG. 3. The location axis 204 may be arranged as a plurality of different locations. In some embodiments, the content locations are selected based on a distance from a current location of the display device that is accessing the fabric 200. For example, locations closest to the display device are arranged in the top column 210a and the locations furthest from the display device are arranged in the bottom column 210g. Likewise, topics may be arranged based on themes or nearest to the display device. For example, food content may be in layer 212a, entertainment content in layer 212b, transportation content in layer 212c, etc. In other embodiments, the topics may be arranged based on frequency of access to the user based on location.

The fabric 200 in the multi-dimensional fabric system illustrates a plurality of icons 214 where each represents separate content (also referred to as content 214). The content 214 is laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments of the augmented reality system for enabling portal functionality in a multi-dimensional fabric user interface, the location rows 210a-210g, time columns 208a-208e, and topic layers may be independent from one another such that a user can manipulate a single axis. In other embodiments, the user can manipulate two or more axes. For example, a user can vertically scroll along the location axis 204 through a single column (e.g., single time period on the time axis), such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis), such as row 210d, without affecting the other rows or layers, or the user can horizontally scroll along the time axis 202 for multiple rows or multiple layers, or both. Moreover, the user can depth scroll along the topic axis 206 through a single layer (e.g., single topic on the topic axis), such as layer 212a, without affecting the other rows or columns, or the user can depth scroll along the topic axis 206 for multiple rows or multiple columns, or both.

By providing input to one or more axes in the augmented reality system for enabling portal functionality in a multi-dimensional fabric user interface, the user can manipulate or move the fabric 200 to access content for a specific time, a specific location, and a specific topic. The user can scroll on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content 214, such as the content in the middle (along time and location axes) and on top (along the topic axis) of the fabric by moving their arm away from the display screen or by making a first or by opening their hand.

In some embodiments of the augmented reality system for enabling portal functionality in a multi-dimensional fabric user interface, the fabric will look two dimensional to a user, but is actually three dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

Figure 5:
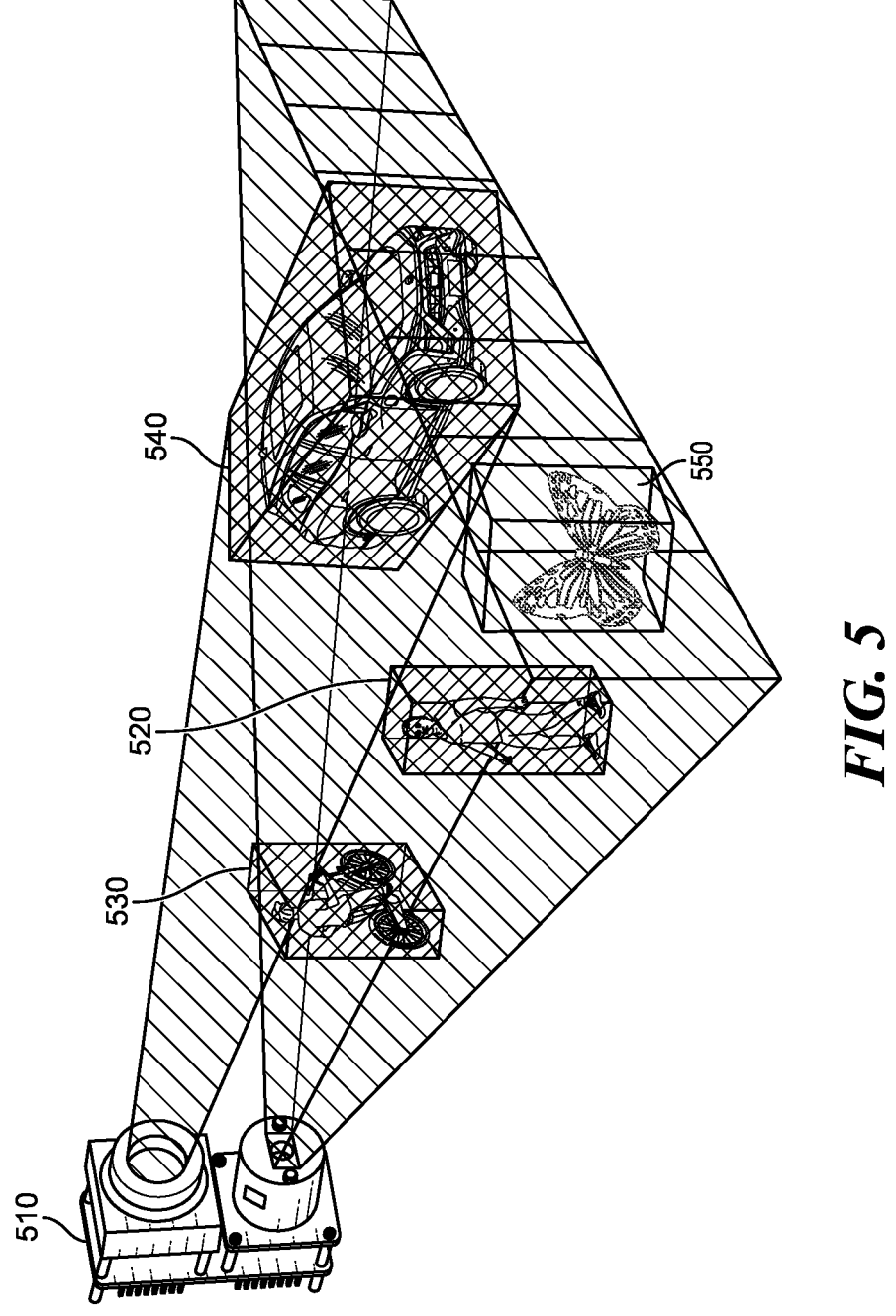
FIG. 5 illustrates a hardware sensor array that is used to capture images and measurements of a physical space that may be represented as a simulated space.

Example fabric 300 in FIG. 3 is similar to fabric 200 in FIG. 2, but is an example of how the fabric 300 can be displayable to a user outside of a common virtual space. Examples of using a multi-dimensional fabric within a common virtual space are shown in FIGS. 5-7.

In this example illustration in FIG. 3, the current time period 302 is illustrated in a middle column with future time periods 306a, 306b to the right of the current time period 302 and past time periods 304a, 304b to the left of the current time period. Each location 310 in the current time period 302 includes a plurality of topics 312. These topics 312 are similar to the layers 212a-212d in FIG. 2.

Again, the user in the multi-dimensional fabric system can move or manipulate the fabric 300 along one or more axes to select a particular piece of content. Once selected, the particular content is displayed to the user. Various embodiments, of the multi-dimensional fabric described herein can be used for a variety of different content storage technologies. One example technology is the fluid timeline social network described in U.S. patent application Ser. No.

16/300,028, filed Nov. 8, 2018, titled FLUID TIMELINE SOCIAL NETWORK, and issued Aug. 18, 2020, as U.S. Pat. No. 10,747,414, which is incorporated herein by reference.

The operation of certain aspects of the disclosure will now be described with respect to FIGS. 4A and 4B. In at least one of various embodiments of the augmented reality system for enabling portal functionality in a multi-dimensional fabric user interface, process 400 described in conjunction with FIG. 4A may be implemented by or executed by a system of one or more computing devices, such as display device 108 in FIG. 1, and process 450 described in conjunction with FIG. 4B may be implemented by or executed by a system of one or more remote computing devices, remote server 102.

Figure 4A:
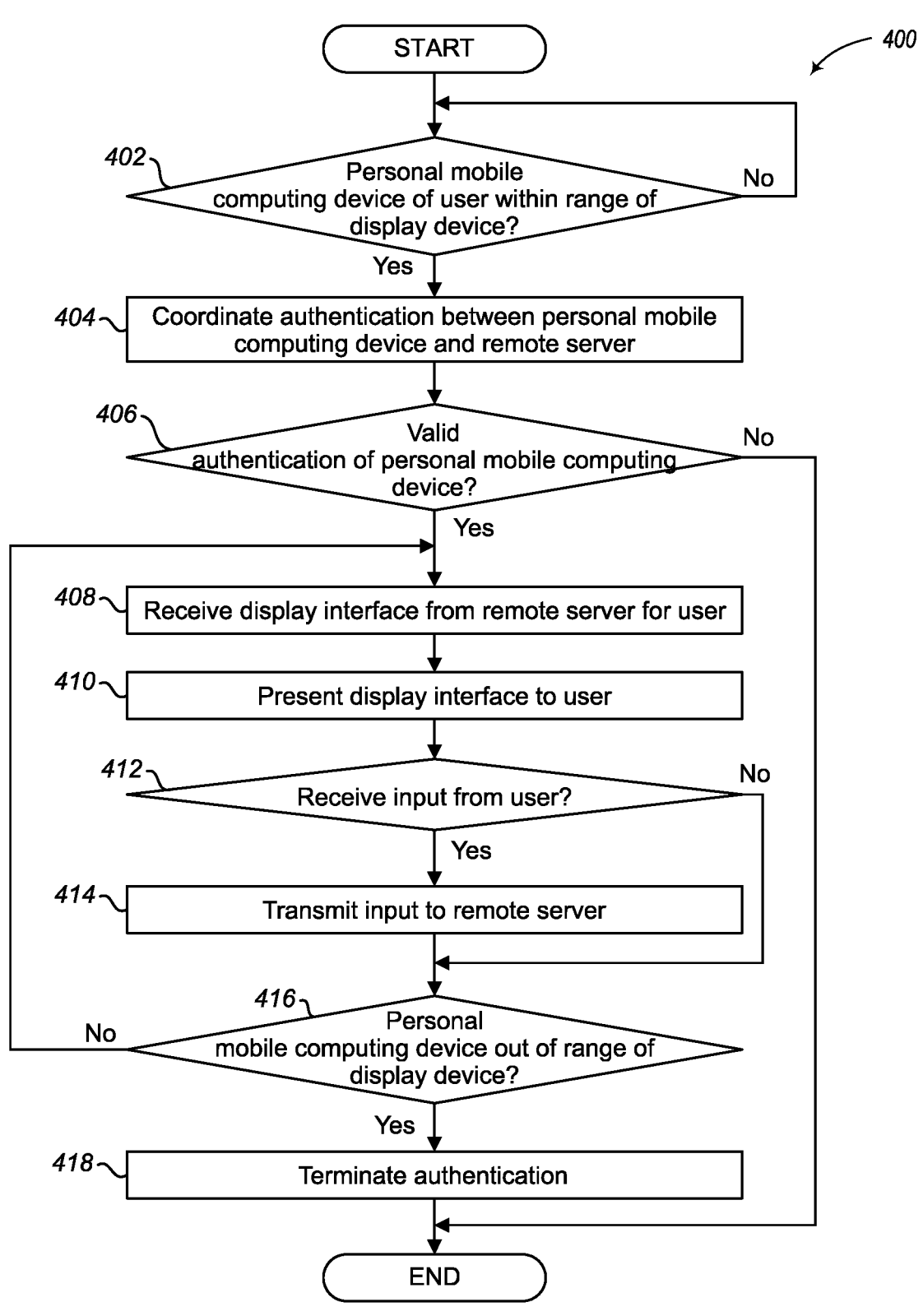
FIG. 4A illustrates a logical flow diagram generally showing one embodiment of a process for accessing a remote server from a display device to present a graphical user interface of a multi-dimensional fabric user interface in accordance with embodiments described herein.

FIG. 4A illustrates a logical flow diagram generally showing one embodiment of a process 400 for accessing a remote server from a display device to present a graphical user interface of a multi-dimensional fabric in accordance with embodiments described herein. In some embodiments, authentication is performed between the personal mobile computing device and a remote server. In other embodiments of the augmented reality system for enabling portal functionality in a multi-dimensional fabric user interface, a different authentication system may be employed. In still other embodiments of the augmented reality system for enabling portal functionality in a multi-dimensional fabric user interface, no authentication system in employed.

Process 400 begins, after a start block, at decision block 402, where a determination is made whether a personal mobile computing device of a user is within range of the display device. This determination may be made when the personal mobile computing device is within a threshold distance from the display device (e.g., using one or more range detection devices) or when the user indicates or requests to interact with the display device. If the personal mobile computing device is within range of the display device, then process 400 flows to block 404; otherwise process 400 loops to decision block 402 until a personal mobile computing device is within range of the display device.

At block 404, the display device coordinates authentication between the personal mobile computing device and a remote server. This coordination may include obtaining, requesting, or otherwise forwarding authentication keys or other information to determine the validity or authenticity of the personal mobile computing device as being authorized to access the remote server.

Process 400 proceeds to decision block 406, where a determination is made whether the personal mobile computing device is validly authenticated with the remote server. In some embodiments, the remote server may provide a token, session identifier, or other instruction to the display device indicating that the user of the personal mobile computing device is authorized to access the remote server via the display device. If the personal mobile computing device is valid, then process 400 flows to block 408; otherwise, process 400 terminates or otherwise returns to a calling process to perform other actions.

At block 408, the display device receives a display interface from the remote server for the user. In various embodiments, the display interface is customized for the user, such as if the user logged directly onto the remote server to access personal content. As described herein, this display interface is a multi-directional fabric that the user can manipulate, as described herein.

Process 400 continues at block 410, where the display device presents the display interface to the user of the personal mobile computing device. In some embodiments, the display interface is displayed directly by the display device. In other embodiments, the display interface is displayed via the personal mobile computing device.

Process 400 proceeds next to decision block 412, where a determination is made whether the display device has received input from the user. As described herein, the input may be provided via a hand gesture without touching a screen of the display device. Such hand gesture may be a swipe left or right, swipe up or down, or movement towards or away from the screen of the display device. A selection input can then be received if the user rapidly moves their hand away from the screen of the display device or if the user opens or closes his/her hand. If user input is received, then process 400 flows to block 414; otherwise, process 400 flows to decision block 416.

At block 414, the display device transmits the user input to the remote server. Process 400 proceeds to decision block 416, where a determination is made whether the personal mobile computing device is out of range of the display device (e.g., outside of a threshold distance or the user de-activated the session). If not, process 400 loops to block 408 to receive an updated or modified display interface (based on the user input) and present it to the user. If the personal mobile computing device is out of range of the display device, then process 400 flows to block 418 to terminate the authentication with the remote server. After block 418, process 400 may terminate or otherwise return to a calling process to perform other actions. In some embodiments, process 400 may loop to decision block 402 to wait for another personal mobile computing device to be within range of the display device.

Figure 4B:
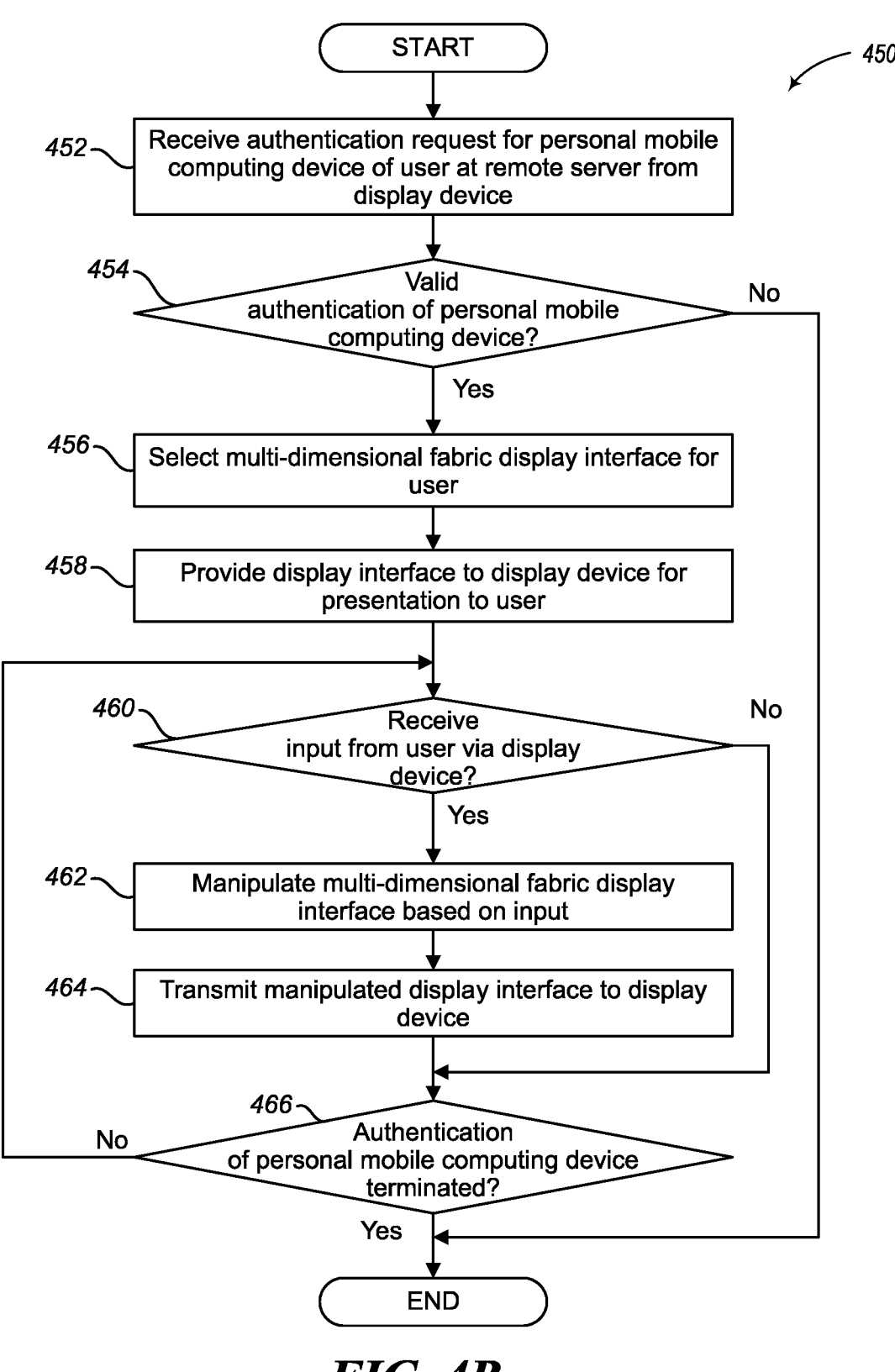
FIG. 4B illustrates a logical flow diagram generally showing one embodiment of a process for a remote server to provide a graphical user interface of a multi-dimensional fabric user interface to a display device in accordance with embodiments described herein.

FIG. 4B illustrates a logical flow diagram generally showing one embodiment of a process 450 in the augmented reality system for enabling portal functionality in a multi-dimensional fabric user interface for a remote server to provide a graphical user interface of a multi-dimensional fabric to a display device in accordance with embodiments described herein.

Process 450 begins, after a start block, at block 452, where an authentication request is received at a remote server from a display device for a personal mobile computing device of a user. In some embodiments, the authentication request may include encryption keys, user credentials, or other authentication information. Process 450 proceeds to decision block 454, where a determination is made whether the personal mobile computing device is validly authenticated or not. If the personal mobile computing device is valid, process 450 flows to block 456; otherwise, process 450 terminates or otherwise returns to a calling process to perform other actions.

At block 456, the remote server selects a multi-dimensional fabric display interface for the user of the personal mobile computing device. In some embodiments, the remote server instantiates or accesses a previously running version of the multi-dimensional fabric operating system for the user. In various embodiments, each separate user (or a group of multiple users) has a corresponding multi-dimensional fabric user interface accessible via the remote server. The multi-dimensional fabric display interface with content laid out in a fabric-like structure based on at least time, location, and topic such that the user can manipulate or move the fabric in one or more dimensions to select content.

Process 450 proceeds to block 458, where the remote server provides the selected display interface to the display device for presentation to the user. Process 450 continues at decision block 460, where a determination is made whether user input has been received from the display device. In various embodiments, the input may be a change or selection of one or more dimensions of the fabric or a user selection. If user input has been received, process 450 flows to block 462; otherwise, process 450 flows to decision block 466.

At block 462, the remote server manipulates the multi-dimensional fabric display interface based on the user input. In some embodiments, the manipulated display interface may include displaying specific content selected by the user. In other embodiments, the manipulated display interface may show a different section or area of the multi-dimensional fabric user interface based on the user input.

Process 450 proceeds next to block 464, where the remote server transmits the manipulated display interface to the display device. Process 450 continues next at decision block 466, where a determination is made whether the authentication of the personal mobile computing device has terminated. In some embodiments, the display device transmits a termination request to the remote server when the user of the personal mobile computing device walks away from or is out of range of the display device. If the authentication is terminated, process 450 terminates or otherwise returns to a calling process to perform other action; otherwise, process 450 loops to decision block 460 to receive additional user input from the display device.

Referring now to FIGS. 5-7, the augmented reality system for enabling portal functionality in a multi-dimensional fabric user interface is described. Specifically, in FIG. 5 a hardware sensor array 510 is shown that is used to capture images and measurements of a physical space that may be represented as a simulated space. The hardware sensor array may also be used to capture images and measurements of people 520, bicycles 530, automobiles 540, animals 550, or other objects that may be loaded into the simulated space. Additionally, in some embodiments multiple physical spaces are captured (e.g., images and measurements) by the hardware sensor array, and then linked together in the simulated space. In other aspects of some embodiments, multiple physical spaces are captured by the hardware sensor array, and various aspects or portions of the multiple physical spaces are merged into a single simulated space. In still other aspects of some embodiments, multiple physical spaces are captured by the hardware sensor array and saved as distinct alternate simulated spaces.

In some embodiments, the hardware sensor array includes one or more of imaging sensors, 3D sensors, LIDAR (light detection and ranging) sensors, SONAR (sound navigation ranging) sensors, RADAR (radio detection and ranging) sensors, infrared sensors, proximity sensors, Ultrasonic sensors, time of flight sensors, and other sensors. In some such sensors, the hardware sensor array captures one or more of flat images. While in other embodiments, the hardware sensor array captures one or more of images with depth resolution. Thus, the hardware sensor array may be used to obtain the information (e.g., images, measurements, and the like) used to create a virtual representation of the physical space that may be represented as a simulated space.

The image sensors are sensors that detect and convey information used to make an image. It does so by converting the light waves into signals convey the information. The waves can be light or other electromagnetic radiation. The ranging sensors are sensors that detect distance to the target of interest. By determining the distance to the target of interest, the size of the target of interest may be determined and used to size the images in proper proportion.

Additionally, in one or more embodiments, the augmented reality system for enabling portal functionality, further includes the remote server 102 in FIG. 1. The remote server 102 has a server memory that stores server computer instructions, and a server processor that executes the server computer instructions and causes operations to occur. In some embodiments, the remote server 102 enables the user to create a simulated space 710 (shown in FIG. 7) in the multi-dimensional fabric user interface.

Figure 6A:
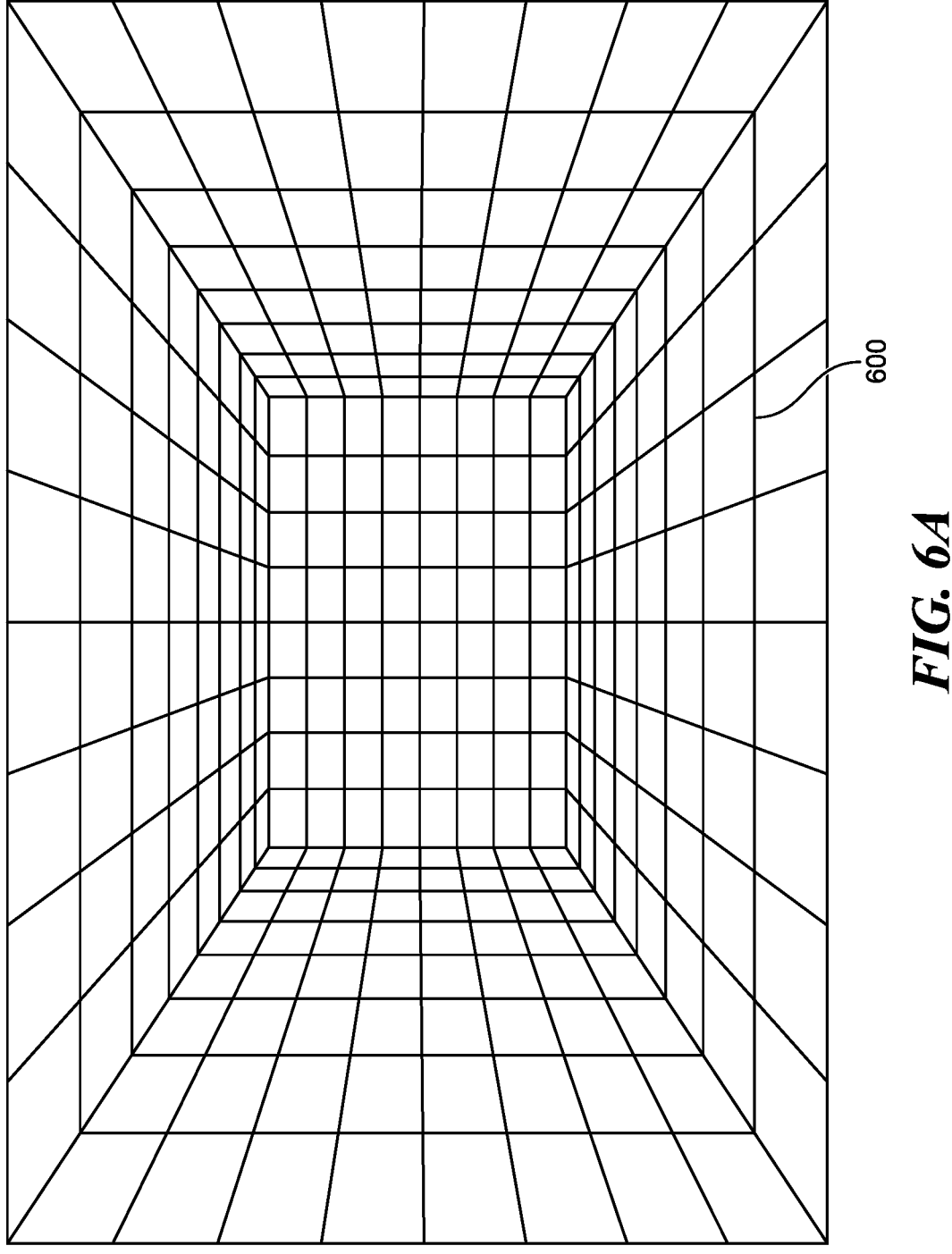
FIG. 6A illustrates an empty matrix of simulated space created by the user augmented reality system for enabling portal functionality in a multi-dimensional fabric user interface.
Figure 7:
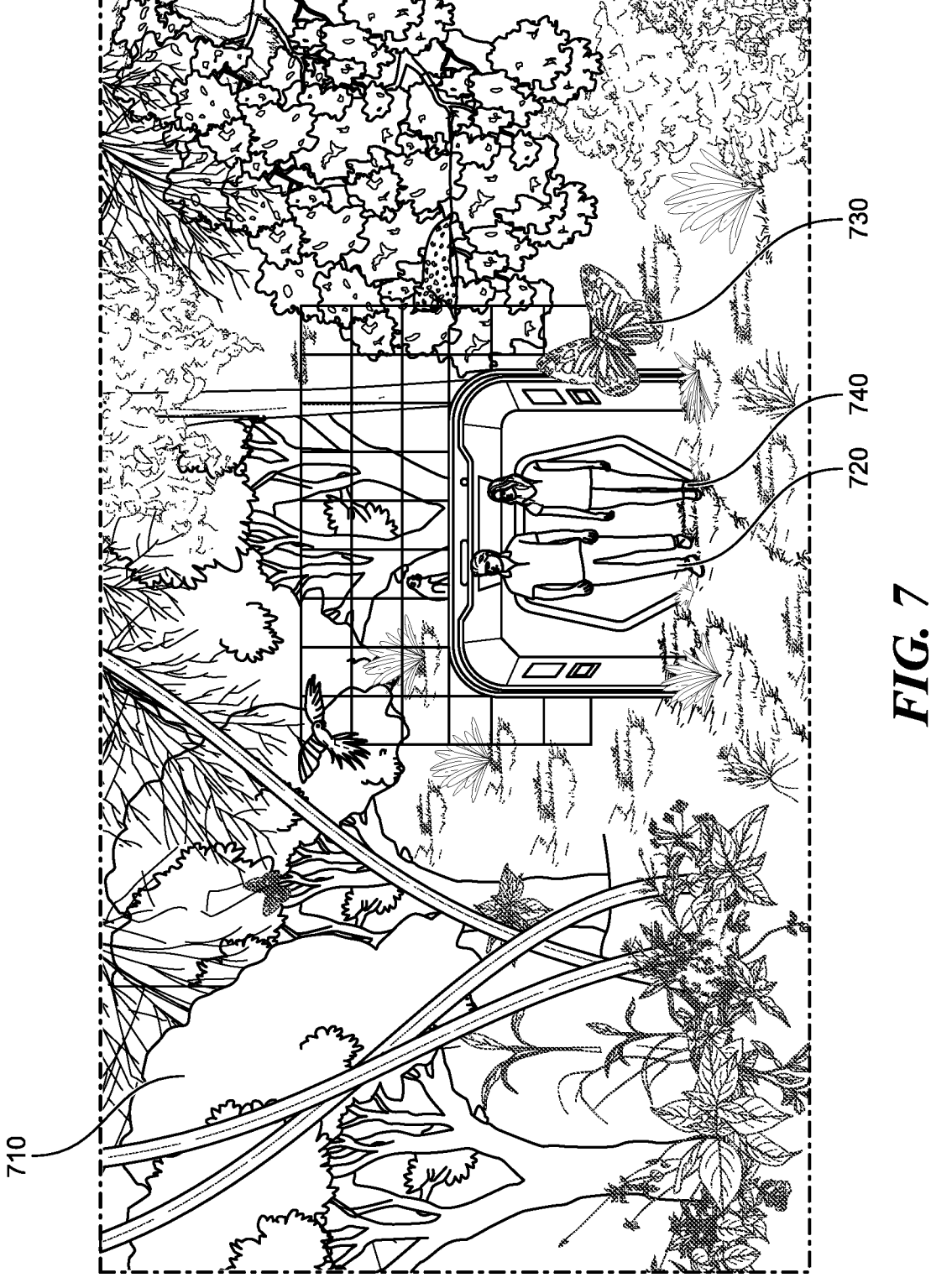
FIG. 7 illustrates a virtual representation of the physical space loaded into the simulated space that was captured by the hardware sensor array.

As shown in FIG. 6A, in one such embodiment, the initial simulated space is a type of empty matrix 600 into which a virtual representation may be loaded. In some embodiments, the augmented reality system creates the empty simulated space 600 as a framework into which content may later by inserted. This type of empty space is sometimes referred to as a "whitespace." This empty simulated space 600 may be the default framework upon which various simulated spaces 710 may be loaded.

FIG. 6B is a logic diagram showing virtual representation of the physical space loaded into the simulated space that was captured by the hardware sensor array. As shown in FIG. 6B, at operation 610, a hardware sensor array is accessed, which captures images and measurements of a physical space. At operation 620 a simulated space is created in the multi-dimensional fabric user interface. At operation 630, a virtual representation of the physical space is calculated using the captured images and measurements. At operation 640, the virtual representation of the physical space is placed into the simulated space. At operation 650, an initial portal is created in the multi-dimensional fabric user interface that connects to the simulated space. At operation 660, one or more users are enabled to access the portal in the multi-dimensional fabric user interface to enter the simulated space. At operation 670, the one or more users are enabled to interact with virtual objects in the simulated space. At operation 680, the one or more users are enabled to create an additional portal within the simulated space.

As shown in FIG. 7, this virtual representation of the physical space may be loaded into the simulated space 710. Specifically, FIG. 7 is a third person perspective view of the user 720 (technically the avatar of the user) in the simulated space 710 along with one or more of virtual objects 730, virtual people 740, and other users. In such embodiments, the augmented reality system enables the user 720 to interact with virtual objects 730, as well as one or more virtual people 740 or other users, in the virtual representation of the physical space in the simulated space 710. The hardware sensor array 510 captures image and measurement information of people 520 and animals 550 using image capture systems and range finder systems. This image and measurement information is then used to code the images and measurements of the user 720 and animals 730 in the simulated space 710 in FIG. 7. The images and measurements captured by the hardware sensor array 510 enables the accurate reproduction of real people 520 and animals 550 in FIG. 5 into the user's avatar 720 and virtual animals 730 in the simulated space 710 shown in FIG. 7.

In another aspect, the augmented reality system calculates a virtual representation of the physical space using the captured images and measurements of the people and objects in the physical space, as obtained by the hardware sensor array 510. This virtual representation of the physical space is the simulated space 710 in one or more embodiments. Numerous simulated spaces may be created by the user and stored in the system. The user 720 may then access one or more of the numerous simulated spaces as desired at various times. In some embodiments, the hardware sensor array 510 of the augmented reality system may capture images and measurements of the people and objects in the physical space at different times, or over a period of time to more accurately represent how that physical space (and thus the corresponding simulated space 710) can change over time. In another aspect of some embodiments, the hardware sensor array 510 of the augmented reality system may capture images and measurements of the people and objects at different physical locations, such as adjacent physical locations, so that the locations in corresponding simulated space 710 will be accurate as the user 720 moves from one location (e.g., a first city) to a another location (e.g., a second city) within the simulated space 710.

Thus, the simulated space 710 (shown in FIG. 7) is no longer an empty matrix 600 (shown in FIG. 6), but rather the simulated space 710 presents a virtual representation of the physical space captured by the hardware sensor array 510 (shown in FIG. 5). The user 720 may explore the simulated space 710 at his or her leisure. In some embodiments, the simulated space 710 is programmed to replay a certain event or period of time over and over again. In other embodiments, the simulated space 710 is programmed to let time continuously run just as in the real world. In still other embodiments, the simulated space 710 is programmed to let time continuously run, but in slow motion compared to the real world. For example, this slow motion time may enable a user 720 to savor a fantastic experience or moment in time. In yet other embodiments, the simulated space 710 is programmed to let time continuously run, but in faster motion compared to the real world. For example, this faster motion time may enable a user 720 to practice a sporting event or other competitive event as a training exercise so that the real time event of competition seems less challenging.

Figure 8:
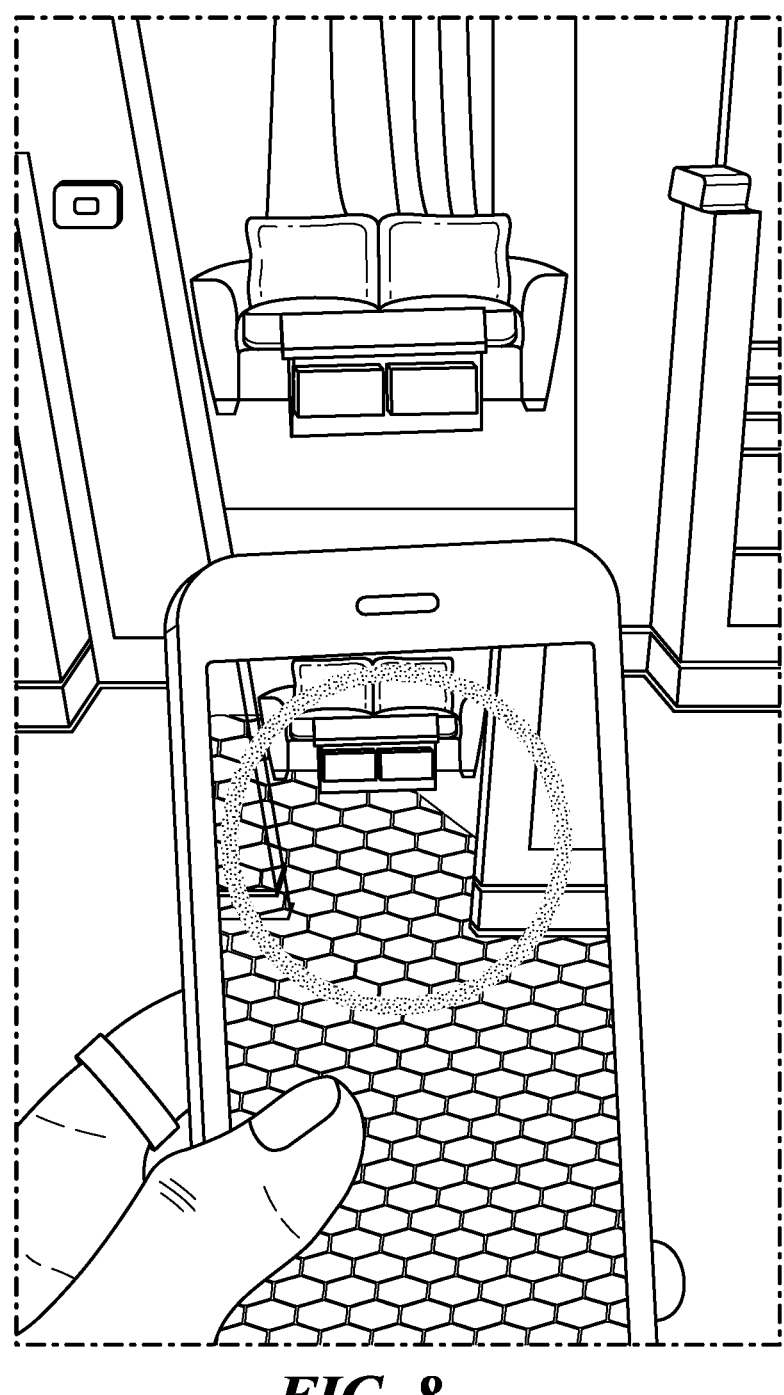
FIG. 8 illustrates the initial creation of a portal in the multi-dimensional fabric user interface through a personal mobile computing device.
Figure 9:
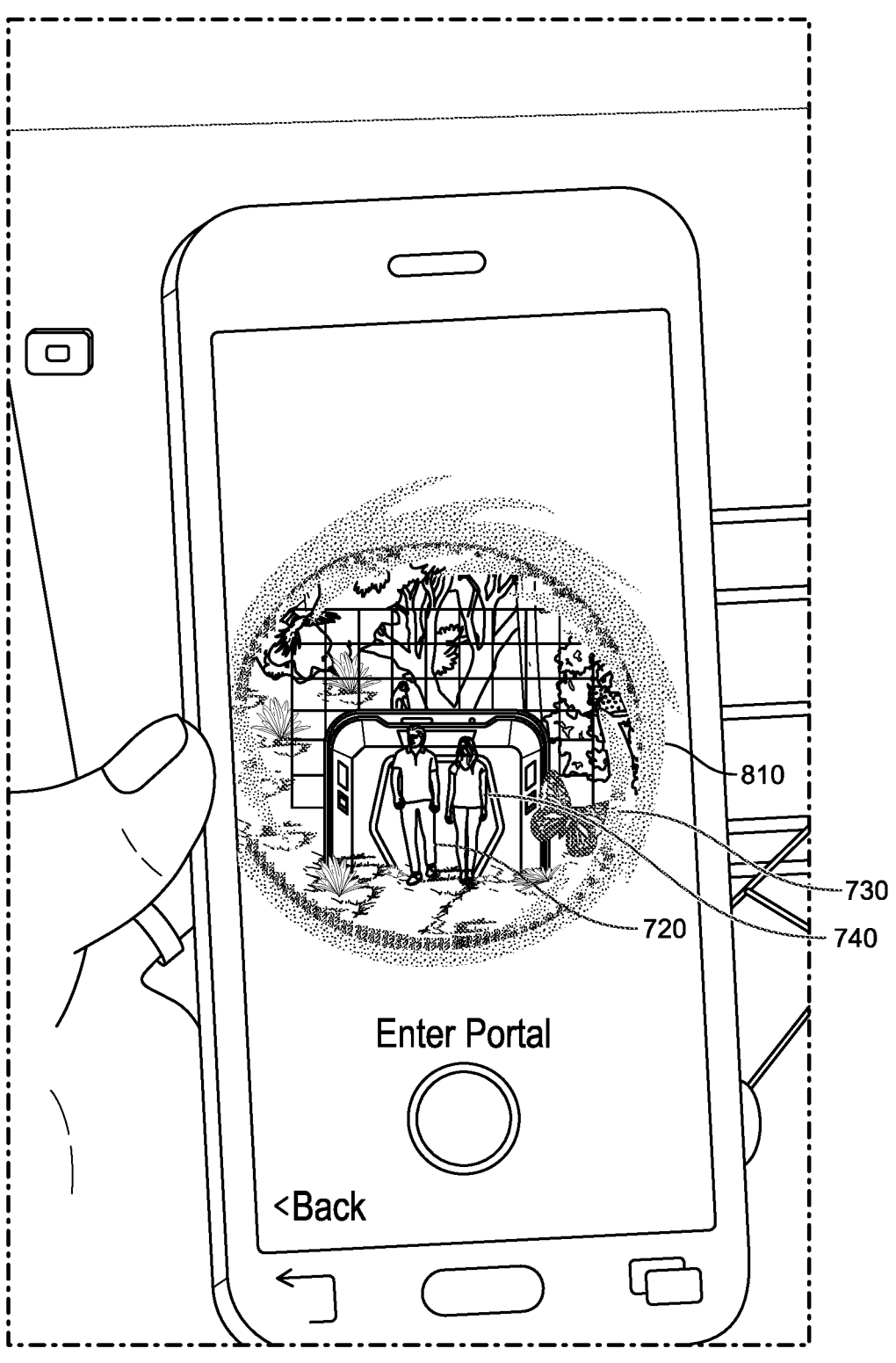
FIG. 9 illustrates the created portal in the multi-dimensional fabric user interface through a personal mobile computing device, wherein the simulated space is viewable through the portal on a personal mobile computing device.
Figure 10:
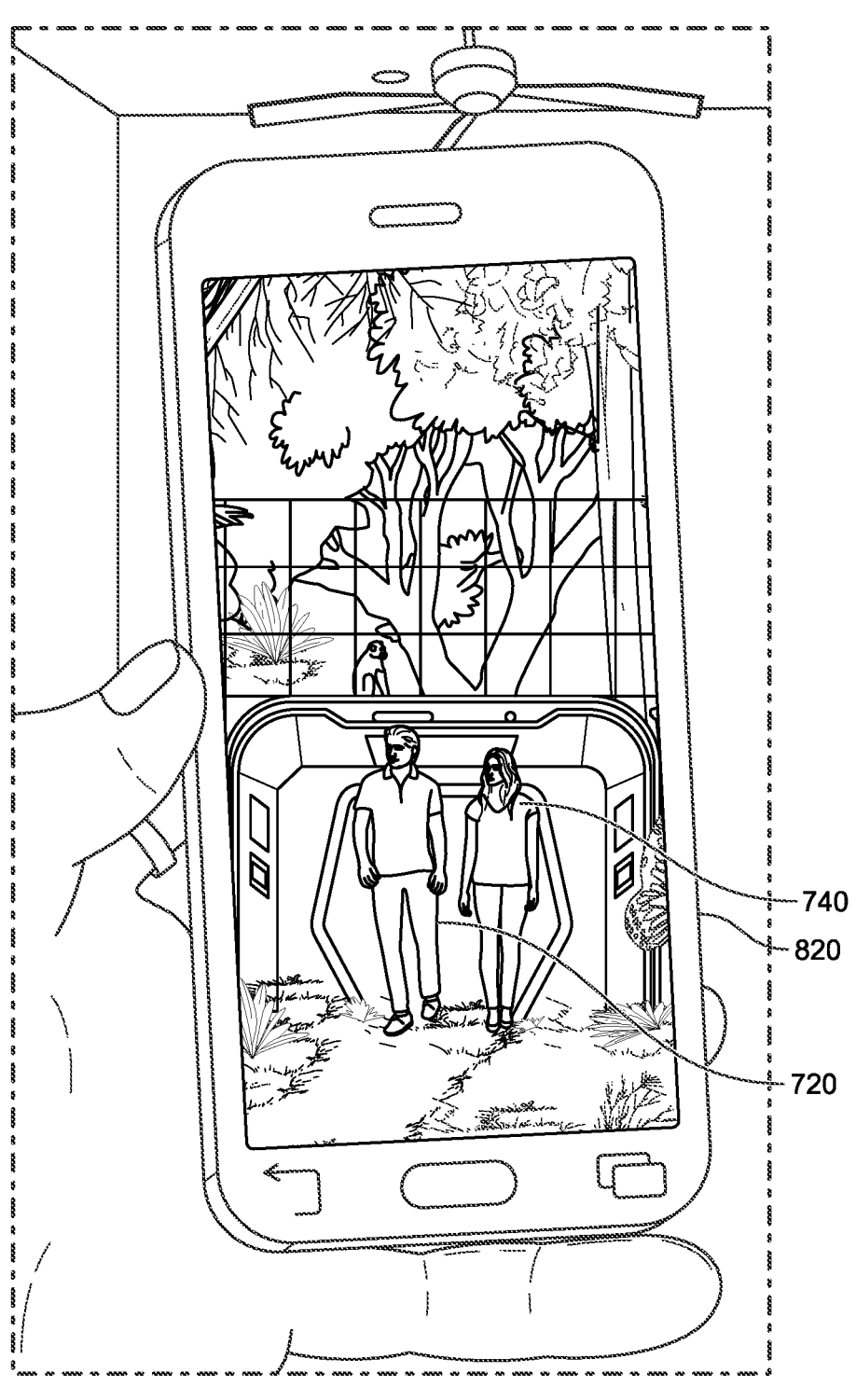
FIG. 10 illustrates the simulated space that is viewable through the personal mobile computing device after the user walks through the portal on a personal mobile computing device.

Referring now to FIGS. 8-10, in some aspects of the augmented reality system for enabling portal functionality in a multi-dimensional fabric user interface, the remote server 102 (shown in FIG. 1) enables the user 720 (technically the avatar of the user) to create an initial portal 810. Specifically, the system enables the user 720 to create an initial portal 810 in the multi-dimensional fabric user interface that connects to the virtual representation of the physical space in the simulated space 710. In some aspects of the augmented reality system for enabling portal functionality, the system then enables one or more users 720 to access the initial portal 810 in the multi-dimensional fabric user interface and enter the virtual representation of the physical space in the simulated space 710, as discussed.

In FIG. 8, the initial portal 810 is shown being created in the multi-dimensional fabric user interface, using a personal mobile computing device 820. The personal mobile computing device 820 is an embodiment of the personal mobile computing devices 124 or display devices 108 shown in FIG. 1. In this stage of the portal formation, the initial portal 810 may be seen at its outer edges, but a user 720 cannot see what is on the other side of the portal 810 through the interior of the portal. In some embodiments, after the initial portal 810 has been fully created, a user 720 still is not able to view the simulated space 710 on the other side of the portal. In such an embodiment, the only way for the user 720 to see what is on the other side of the portal is to enter the portal (or technically, have their avatar enter the portal), as is shown in FIG. 10.

In other embodiments, such as those disclosed in FIG. 9, the portal 810 may enable a user 720 to look through the portal 810 in the multi-dimensional fabric user interface and see the simulated space on the other side of the portal 810. Thus, in the embodiment shown in FIG. 9, the portal 810 is fully created and the user 720 is able to look through the portal 810 and see the virtual representation of the physical space in the simulated space on the other side of the portal 810, using a personal mobile computing device 820. In still other embodiments, the user 720 may not be able to initially see through the portal and see the virtual representation of the physical space in the simulated space on the other side of the portal 810 until after the user 720 takes a certain action or initiates a certain operation to cause the portal to become open as a viewing port.

Moreover, in one or more embodiments, the augmented reality system for enabling portal functionality in a multi-dimensional fabric user interface enables the user to look through a first location side of the portal 810, as shown in FIG. 9, and see a virtual person 740 or another user in a virtual representation of a second actual physical location in the multi-dimensional fabric user interface. In some such embodiments, the augmented reality system enables the user to look through the first location side of the portal 810 and interact with one or more of virtual persons 740, other users, virtual objects 730, virtual locations, or virtual events in the virtual representation of the second actual physical location in the multi-dimensional fabric user interface, while still remaining in a virtual representation of a first actual physical location in the multi-dimensional fabric user interface. Such interaction through the portal 810 is similar to the action of a customer interacting with a vender through a service window. These interactions include by way of example only, and not by way of limitation: uploading data, downloading data, posting data, live streaming data, purchasing a product or service, selling a product of service, anchoring digital content to the multi-dimensional fabric, and modifying previously anchored digital content on the multi-dimensional fabric.

Referring now to FIG. 10, in some aspects of the augmented reality system for enabling portal functionality, the system enables the user 720 to enter the simulated space 710, using a personal mobile computing device 820. While the user 720 is in the simulated space 710, the augmented reality system enables the user to interact with virtual objects 730 (shown in FIGS. 7 and 9) in the simulated space 710, using a personal mobile computing device 820. Additionally, the augmented reality system also enables the user 720 to interact with virtual people 740 and/or other users (shown in FIGS. 7 and 9-11) in the simulated space 710, using a personal mobile computing device 820.

Figure 11:
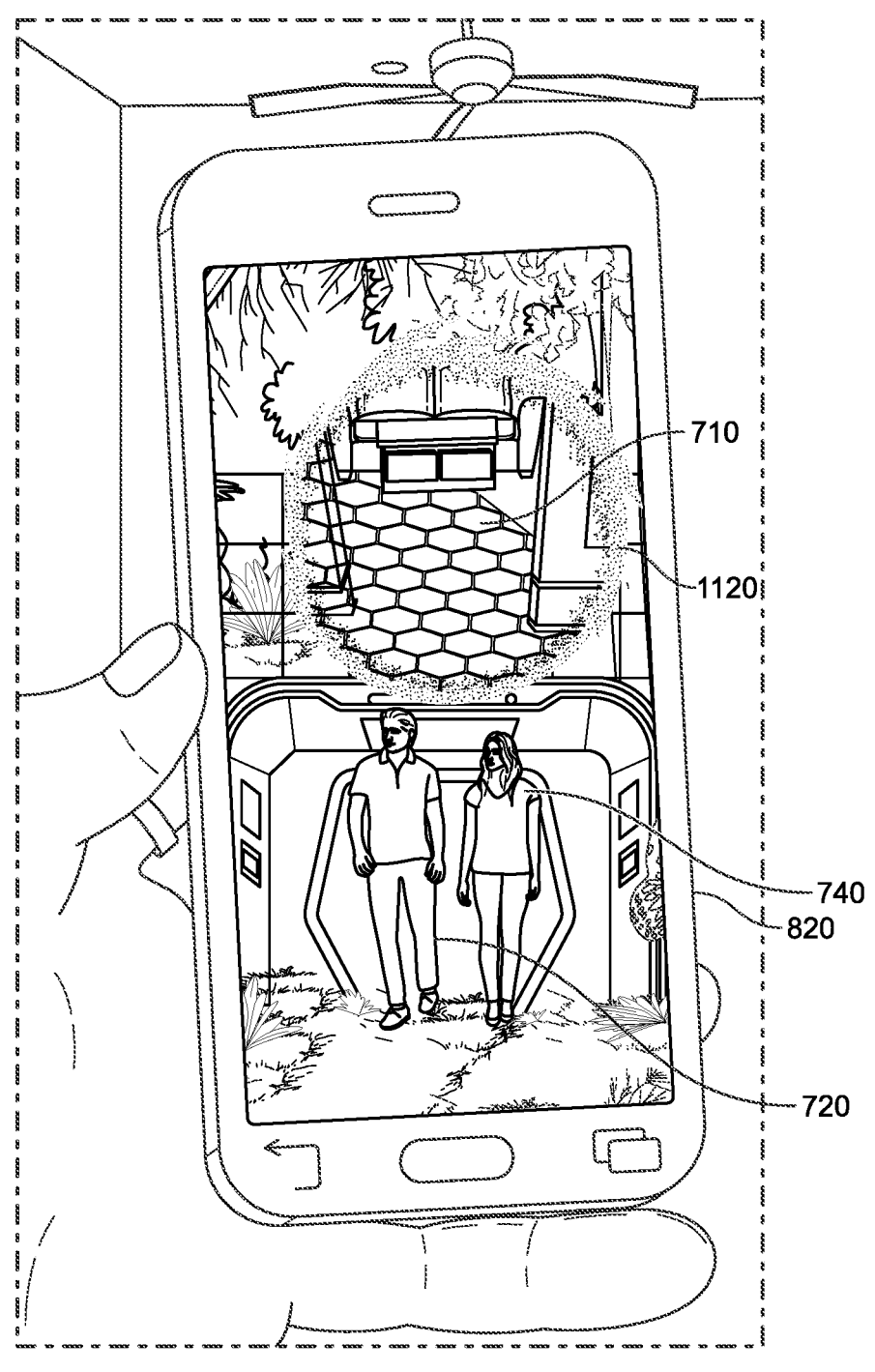
FIG. 11 illustrates the simulated space that is viewable through the personal mobile computing device after the user walks through the portal on a personal mobile computing device.

Referring now to FIG. 11, in one or more implementations, the augmented reality system enables the user 720 to create an additional portal 1120 within the virtual representation of the physical space in the simulated space 710. The additional portal 1120 may be accessed by a processor-based computing device, such as a computer, smart phone, smart watch, wearable VR headset, wearable AR headset, or the like, such as the personal mobile computing devices 820 or display devices shown in FIG. 1. In some implementations, the additional portal 1120 operates to create an exit from the virtual representation of the physical space back to the multi-dimensional fabric user interface. In other implementations, the additional portal 1120 operates to create a subspace within the virtual representation of the physical space in the simulated space 710, which may further be entered by the user 720 (e.g., a sub-simulated space within the simulated space). In some implementations of the augmented reality system, the simulated space is a virtual reality simulated space, while in other embodiments of the augmented reality system, the simulated space is an augmented reality simulated space.

Referring still to FIG. 11, in some embodiments of the augmented reality system, while the user 720 is in the virtual representation of the second actual physical location, the user 720 may view the portal 810 in the display screen of the personal mobile computing device 820 and see the virtual representation of the first actual physical location through the portal 810. As discussed with respect to the other side of the portal 810, the augmented reality system enables the user to look through the second location side of the portal 810, as shown in FIG. 11, and see virtual persons or other users (not shown) in the virtual representation of the first actual physical location in the multi-dimensional fabric user interface. In some such embodiments, the augmented reality system enables the user to look through the second location side of the portal 810 and interact with one or more of virtual persons, other users, virtual objects, virtual locations, or virtual events in the virtual representation of the first actual physical location in the multi-dimensional fabric user interface, while still remaining in the virtual representation of second first actual physical location in the multi-dimensional fabric user interface. As described above, these interactions include by way of example only, and not by way of limitation: uploading data, downloading data, posting data, live streaming data, purchasing a product or service, selling a product of service, anchoring digital content to the multi-dimensional fabric, and modifying previously anchored digital content on the multi-dimensional fabric.

In some embodiments of the augmented reality system, the system further enables the user 720 to control parameters within the simulated space that is accessed by the portal 810. For example, one of the parameters within the simulated space that is controllable by the user 720 is time. In this manner, in some embodiments the user 720 can speed up and/or slow down a rate at which time passes. In other aspects of this parameter control within the simulated space, the user 720 is able to control parameters such as spatial proximity, height/width/depth of objects 730 within the simulated space 710, gravity within the simulated space 710, the appearance of virtual people 740 and/or other users (e.g., make the virtual people 740 and/or other users older, younger, taller, shorter, more attractive, less attractive, shape-shift into other people, animals, or objects), and the like. In still other aspects of the parameter control within the simulated space, the user 720 is able to enhance his avatar within the simulated space with superhero type abilities, (e.g., super strength, super speed, super hearing, flight, telekinesis, and the like).

Additionally, the augmented reality system may also enable the user to load one or more simulated objects 730 and/or one or more virtual people 740 into the simulated space (shown in FIG. 7). In some embodiments of the augmented reality system for enabling portal functionality, the one or more simulated objects 730 and/or one or more virtual people 740 loaded into the simulated space had their images and measurements captured using the hardware sensor array 510. However, in other embodiments, the one or more simulated objects 730 and/or one or more virtual people 740 are loaded into the simulated space without using the hardware sensor array 510, e.g., by having the images and measurements transferred from another server or by having the images and measurements be computer generated. Notably, in some embodiments, the augmented reality system for enabling portal functionality enables the user 720 to position the additional portal 810 anywhere in the simulated space.

Various embodiments, of the multi-dimensional fabric described herein can be used for a variety of different content storage technologies. Some example technology is the fluid timeline social network described in U.S. patent application Ser. No. 16/300,028, filed Nov. 8, 2018, titled Fluid Timeline Social Network, and issued Aug. 18, 2020, as U.S. Pat. No. 10,747,414, and the portal social network described in U.S. patent application Ser. No. 17/751,477, filed May 24, 2022, titled System And Method For Using Portal Systems In Augmented Reality Virtual Environments, which are incorporated herein by reference.

In another aspect of the augmented reality system, once the user 720 is inside the portal 810, the user may use "pinch" and "zoom" gesturing with two or more fingers interfacing with the screen of the personal mobile computing device to bring digital content closer to them (e.g., pinching) or further from them (e.g., zooming). In still another embodiment, a user 720 may upload any augmented reality scenery into the multi-dimensional fabric user interface that is desired (e.g., a space based theoretical physical location, a past actual physical location that no longer exists, an anticipated future physical location that has not yet been built, and the like).

FIG. 12 is a logic diagram showing an augmented reality method for enabling portal functionality in a multi-dimensional fabric user interface. As shown in FIG. 12, at operation 1210, the method creates a simulated space in the multi-dimensional fabric user interface. At operation 1220, the method calculates a virtual representation of the physical space using the captured images and measurements. At operation 1230, the method places the virtual representation of the physical space into the simulated space. At operation 1240, the method creates an initial portal in the multi-dimensional fabric user interface that connects to the simulated space. At operation 850, the method enables one or more users to access the portal in the multi-dimensional fabric user interface to enter the simulated space. At operation 1260, the method enables the one or more users to interact with virtual objects in the simulated space. At operation 1270, the method enables the one or more users to create an additional portal within the simulated space.

Figure 13:
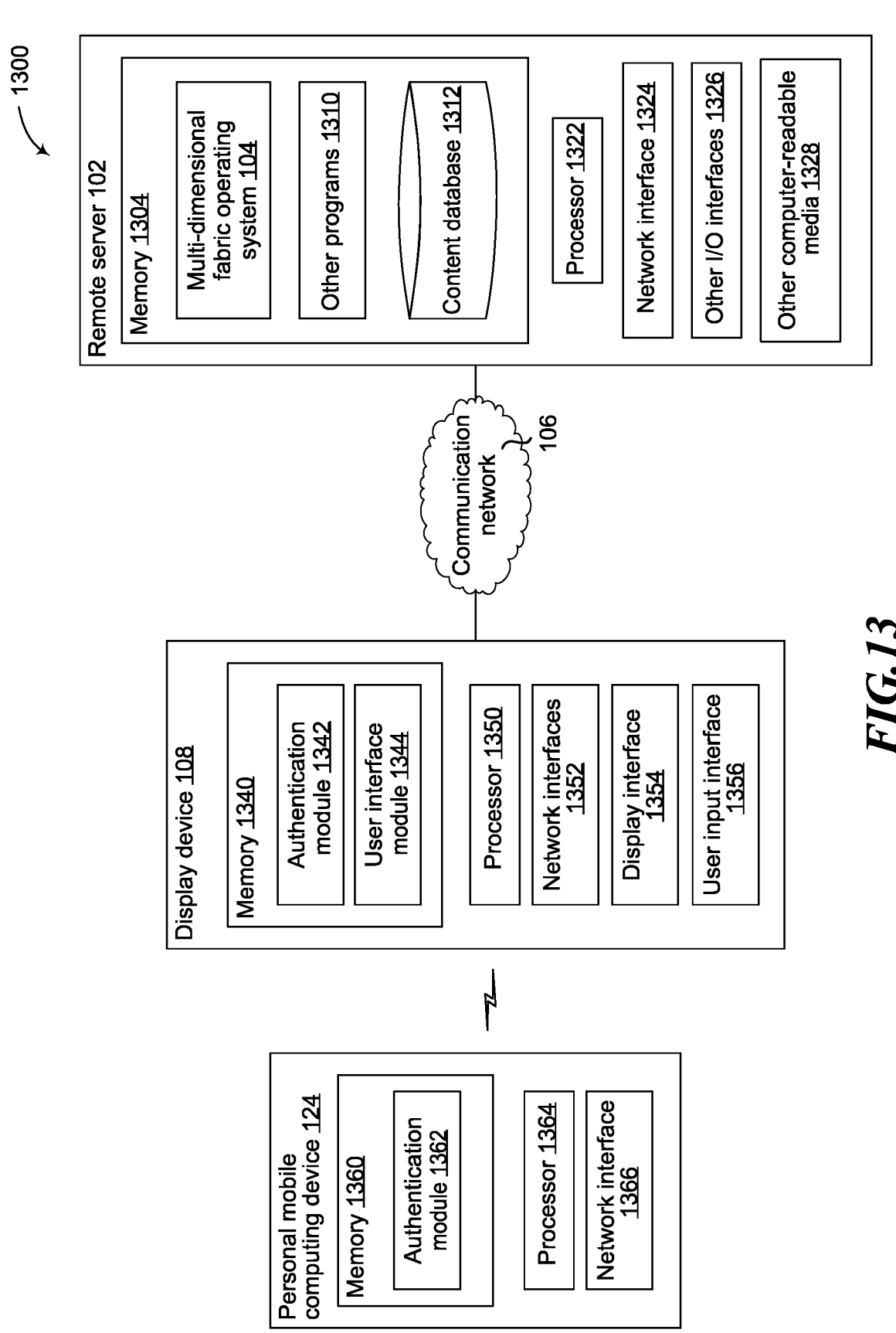
FIG. 13 illustrates a system diagram that describes one implementation of computing systems for implementing embodiments described herein.

FIG. 13 shows a system diagram that describes one implementation of computing systems for implementing embodiments described herein. System 1300 includes remote server 102, one or more display devices 108, and one or more personal mobile computing devices 124.

As described herein, the remote server 102 is a computing device that can perform functionality described herein for implementing an operating system that provides a multi-dimensional fabric user interface for storing content. One or more special purpose computing systems may be used to implement the remote server 102. Accordingly, various embodiments described herein may be implemented in software, hardware, firmware, or in some combination thereof. The remote server 102 includes memory 1304, one or more processors 1322, network interface 1324, other input/output (I/O) interfaces 1326, and other computer-readable media 1328. In some embodiments, the remote server 102 may be implemented by cloud computing resources.

Processor 1322 includes one or more processing devices that execute computer instructions to perform actions, including at least some embodiments described herein. In various embodiments, the processor 1322 may include one or more central processing units ("CPU"), programmable logic, or other processing circuitry.

Memory 1304 may include one or more various types of non-volatile and/or volatile storage technologies. Examples of memory 1304 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 1304 may be utilized to store information, including computer-readable instructions that are utilized by processor 1322 to perform actions, including at least some embodiments described herein.

Memory 1304 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 1304 may include a content database 1312 for storing content in accordance with the multi-dimensional fabric user interface. Memory 1304 may also store other programs 1310. The other programs 510 may include other operating systems, user applications, or other computer programs that are accessible to the personal mobile computing device 124 via the display device 108.

Network interface 1324 is configured to communicate with other computing devices, such as the display devices 108, via a communication network 106. Network interface 1324 includes transmitters and receivers (not illustrated) to send and receive data associated with the multi-dimensional fabric user interface described herein.

Other I/O interfaces 1326 may include interfaces for various other input or output devices, such as audio interfaces, other video interfaces, USB interfaces, physical buttons, keyboards, haptic interfaces, tactile interfaces, or the like. Other computer-readable media 1328 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric user interface to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 1340, one or more processors 1350, network interface 1352, display interface 1354, and user input interface 1356. The memory 1340, processor 1350, and network interface 1352 may be similar to, include similar components, or incorporate embodiments of memory 1304, processor 1322, and network interface 1324 of remote server 102, respectively. Thus, processor 1350 includes one or more processing devices that execute computer instructions to perform actions, including at least some embodiments described herein. In various embodiments, the processor 1350 may include one or more CPUs, programmable logic, or other processing circuitry. The network interfaces 1352 is also configured to communicate with the personal mobile computing devices 124, such as via Bluetooth or other short-range communication protocol or technology.

Memory 1340 may include one or more various types of non-volatile and/or volatile storage technologies. Memory 1340 may be utilized to store information, including computer-readable instructions that are utilized by processor 1350 to perform actions, including at least some embodiments described herein. Memory 1340 may store various modules or programs, including authentication module 1342 and user interface module 1344. The authentication module 1342 may perform actions that coordinate the authentication between the personal mobile computing devices 124 and the remote server 102. The user interface module 1344 receives graphical user interface data from the remote server 102 for display or presentation, via the display interface 1354, to the user of the personal mobile computing devices 124. The user interface module 1344 also receives user input via the user input interface 1356 and provides that input back to the remote server 102. In various embodiments, one or more capacitive, radar, infrared, LIDAR, or other type of gesture capturing sensors may be used to receive the user input. In some other embodiments, the user interface module 1344 may receive user inputs via other input mechanisms, such as a mouse, stylus, voice-recognition, or other input sensors. Memory 1340 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric user interface and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 1360, one or more processors 1364, and a network interface 1366. The memory 1360, processor 1364, and network interface 1366 may be similar to, include similar components, or incorporate embodiments of memory 1340, processor 1350, and network interfaces 1352 of display devices 108, respectively. Thus, processor 1364 includes one or more processing devices that execute computer instructions to perform actions, including at least some embodiments described herein. In various embodiments, the processor 1364 may include one or more CPUs, programmable logic, or other processing circuitry. The network interface 1366 is configured to communicate with the display devices 108, but not with the remote server 102.

Memory 1360 may include one or more various types of non-volatile and/or volatile storage technologies. Memory 1360 may be utilized to store information, including computer-readable instructions that are utilized by processor 1366 to perform actions, including at least some embodiments described herein. Memory 1360 may store various modules or programs, including authentication module

1362. The authentication module 1362 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. An augmented reality system for enabling portal functionality in a multi-dimensional fabric user interface, the system comprising:

a hardware sensor array that captures images and measurements of a physical space;

a remote server that includes a server memory that stores server computer instructions and a server processor that when executing the server computer instructions causes the remote server to:

create a simulated space in the multi-dimensional fabric user interface;

calculate a virtual representation of the physical space using the captured images and measurements;

place the virtual representation of the physical space into the simulated space;

create an initial portal in the multi-dimensional fabric user interface that connects to the simulated space;

enable one or more users to access the portal in the multi-dimensional fabric user interface to enter the simulated space;

enable the one or more users to interact with virtual objects in the simulated space; and enable the one or more users to create an additional portal within the simulated space.

2. The system of claim 1, wherein the additional portal operates to create an exit from the simulated space back to the multi-dimensional fabric user interface.

3. The system of claim 1, wherein the additional portal operates to create a subspace within the simulated space.

4. The system of claim 1, wherein the additional portal operates to create a conduit from the simulated space to another simulated space.

5. The system of claim 1, wherein the hardware sensor array uses LIDAR to capture one or more of flat images and images with depth resolution.

6. The system of claim 1, wherein the simulated space is one or more of a virtual reality simulated space or augmented reality simulated space.

7. The system of claim 6, wherein one of the parameters within the simulated space that is controllable by the user is time, and wherein the user can speed up or slow down a rate at which time passes.

8. The system of claim 1, wherein the server processor executes further server computer instructions that further cause the remote server to enable the user to control parameters within the simulated space.

9. The system of claim 1, wherein the server processor executes further server computer instructions that further cause the remote server to enable the user to load one or more of simulated objects and simulated people into the simulated space.

10. The system of claim 9, wherein the loaded one or more of simulated objects and simulated people into the simulated space had their images and measurements captured using the hardware sensor array.

11. The system of claim 1, wherein the server processor executes further server computer instructions that further cause the remote server to enable the user to position the additional portal anywhere in the simulated space.

12. The system of claim 1, wherein the remote server when executing the server computer instructions further causes the remote server to:

enable the user to look through a first side of the portal on the personal mobile device and interact with one or more of other users, virtual locations, or virtual events in another simulated space while the user remains in the simulated space.

13. An augmented reality method for enabling portal functionality in a multi-dimensional fabric user interface, the method comprising:

accessing a hardware sensor array that captures images and measurements of a physical space;

accessing a remote server that includes a server memory that stores server computer instructions and a server processor that executes the server computer instructions;

creating a simulated space in the multi-dimensional fabric user interface;

calculating a virtual representation of the physical space using the captured images and measurements;

placing the virtual representation of the physical space into the simulated space;

creating an initial portal in the multi-dimensional fabric user interface that connects to the simulated space;

enabling one or more users to access the portal in the multi-dimensional fabric user interface to enter the simulated space;

enabling the one or more users to interact with virtual objects in the simulated space; and enabling the one or more users to create an additional portal within the simulated space.

14. The method of claim 13, wherein the additional portal operates to create an exit from the simulated space back to the multi-dimensional fabric user interface.

15. The method of claim 13, wherein the additional portal operates to create a subspace within the simulated space.

16. The method of claim 13, wherein the additional portal operates to create a conduit from the simulated space to another simulated space.

17. The method of claim 13, wherein the hardware sensor array uses LIDAR to capture one or more of flat images and images with depth resolution.

18. The method of claim 13, wherein the simulated space is one or more of a virtual reality simulated space or augmented reality simulated space.

19. The method of claim 13, further comprising enabling the user to control parameters within the simulated space.

20. The method of claim 19, wherein one of the parameters within the simulated space that is controllable by the user is time, and wherein the user can speed up or slow down a rate at which time passes.

21. The method of claim 13, further comprising enabling the user to load one or more of simulated objects and simulated people into the simulated space.

22. The method of claim 21, wherein the loaded one or more of simulated objects and simulated people into the simulated space had their images and measurements captured using the hardware sensor array.

23. The method of claim 13, further comprising: enabling the user to look through a first side of the portal on the personal mobile device and interact with one or more of other users, virtual locations, or virtual events in another simulated space while the user remains in the simulated space.

24. A non-transitory computer-readable storage medium having computer-executable instructions stored thereon that, when executed by a processor, cause the processor to:

receive captured images and measurements of a physical space from a hardware sensor array;

create a simulated space in a multi-dimensional fabric user interface;

calculate a virtual representation of the physical space using the captured images and measurements;

place the virtual representation of the physical space into the simulated space;

create an initial portal in the multi-dimensional fabric user interface that connects to the simulated space;

enable one or more users to access the portal in the multi-dimensional fabric user interface to enter the simulated space;

enable the one or more users to interact with virtual objects in the simulated space; and enable the one or more users to create an additional portal within the simulated space.

25. The non-transitory computer-readable storage medium of claim 24, wherein the computer-executable instructions, when executed by the processor, cause the processor to:

enable the user to look through a first side of the portal on the personal mobile device and interact with one or more of other users, virtual locations, or virtual events in another simulated space while the user remains in the simulated space.

* * * * *